United States Patent [19]
Kwok

[11] 3,729,205
[45] Apr. 24, 1973

[54] GASKETS

[76] Inventor: Michael Kwok, 158 Cedar Lane, Princeton, N.J. 08540

[22] Filed: Jan. 7, 1971

[21] Appl. No.: 104,575

Related U.S. Application Data

[63] Continuation-in-part of Ser. No. 760,118, Sept. 9, 1968, abandoned.

[52] U.S. Cl. ................ 277/229, 161/116, 161/175
[51] Int. Cl. ............................................. B26d 53/00
[58] Field of Search ................ 277/227, 228, 229, 277/235 B, 207, 211; 161/116, 118, 149, 175

[56] References Cited

UNITED STATES PATENTS

| 3,206,229 | 9/1965 | Kramer | 277/230 X |
| 3,622,427 | 11/1971 | Kelley | 161/116 X |

FOREIGN PATENTS OR APPLICATIONS

| 1,252,163 | 12/1960 | France | 277/228 |

*Primary Examiner*—Meyer Perlin
*Assistant Examiner*—Ronald C. Capossela
*Attorney*—Howson and Howson

[57] ABSTRACT

Rubber gaskets internally reinforced with flexible relatively incompressible, preferably fibrous material and externally coated with rubbery material such as coagulated neoprene latex and preferably having at least one concave surface are described. The preferred gaskets are designed to receive a structure to be sealed within the concave surface so that the structure contacts the concave surface in at least two sealing lines. The gaskets are further characterized by having relatively thin rubbery coatings on certain surfaces and relatively thicker coatings on other surfaces in order to provide improved sealing integrity; the thickness of said relatively thin and thick coatings being specified. Methods of making the gaskets are also described.

3 Claims, 10 Drawing Figures

Patented April 24, 1973 3,729,205
FIG.1.
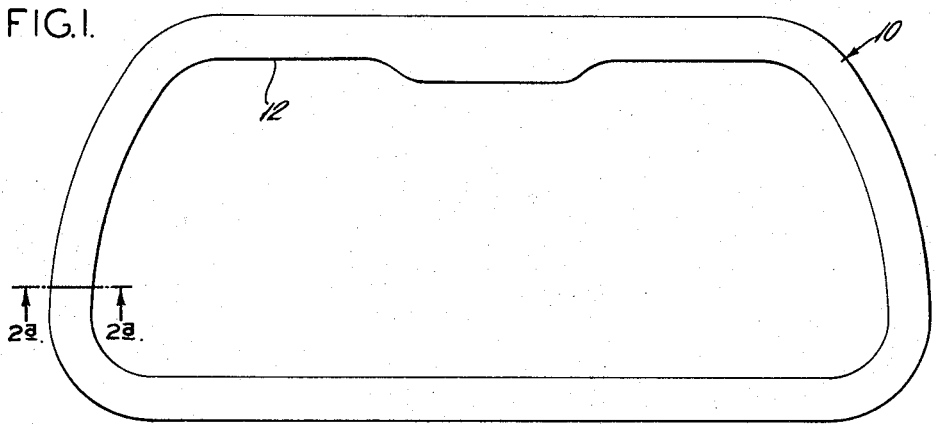
FIG.2ª.
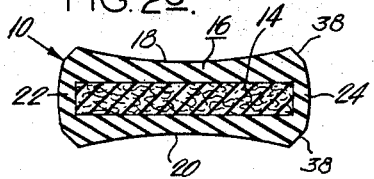
FIG.2ᵇ.
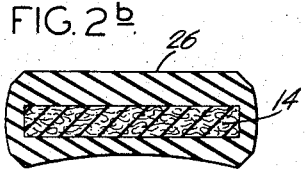
FIG.2ᶜ.
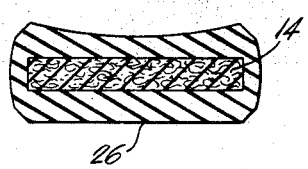
FIG.2ᵈ.
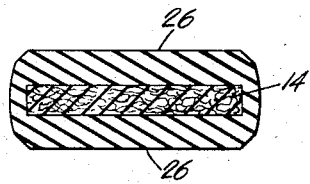
FIG.3ª.
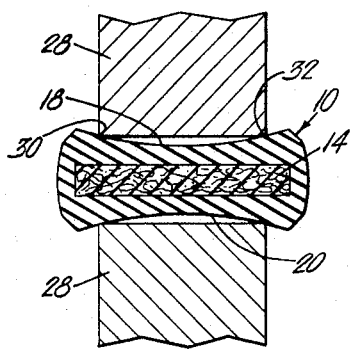
FIG.3ᵇ.
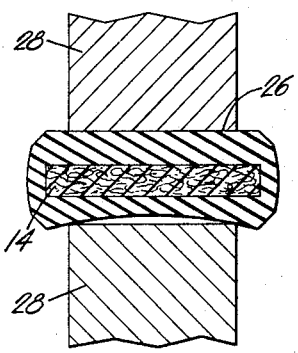
FIG.5.
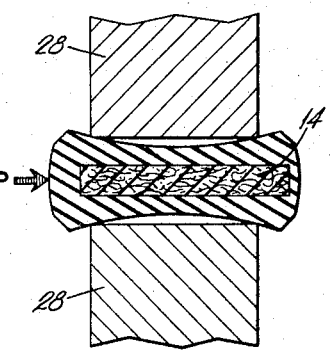
FIG.4ª.
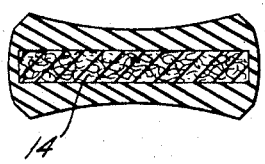
FIG.4ᵇ.
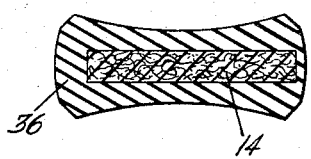
INVENTOR:
MICHAEL KWOK
BY
Howson & Howson
ATTYS.

GASKETS

This application is a continuation-in-part of my earlier U.S. patent application, Ser. Number 760,118, filed Sept. 9, 1968 now abandoned.

BACKGROUND OF THE INVENTION

1. Field of the Invention

The invention relates to novel gaskets and is especially applicable to gaskets for use in sealing automotive valve covers.

2. Description of the Prior Art

Of the many types of gaskets available, several have been used previously for sealing automotive valve covers. The gaskets which have been most commonly used for this purpose are composed of cork or molded rubber and are integrally formed of a single material. The composition cork gaskets are highly compressible, but have good resiliency and recovery properties and resist the corrosive effects of hydrocarbon products found in the automotive environment. Such gaskets perform satisfactorily for a short period of time, but eventually fail as valve cover gaskets due to normal repeated heating and cooling, which tends to set the cork. These gaskets also fail due to opening of the seal caused by engine vibration. Therefore, prolonged positive sealing of valve covers has not been achieved with a cork gasket.

On the other hand, available oil-resistant rubber gaskets, while having good aging, heat and oil resistance, even under sever operating conditions, lack resistance to "cold flow" under compression and tend to creep, thus damaging the seal.

A third type of gasket combining the properties of the cork and rubber gaskets is also known in the art. Typically such gaskets consist of an internal fibrous or cork structure with a rubber coating formed over the internal structure. Such gaskets combine the desirable properties of both cork and rubber gaskets, since the inner structure is relatively stiff and resistant to deformation or "cold flow," while the outer section is conformable to the flanges or other mating surfaces which they seal. These gaskets are also resistant to heat and oil.

However, presently known gaskets having an internal fibrous structure and an external or outer rubber coating are formed by a dip-coating method, or by die cutting gaskets from a rubber-coated fibrous sheet material. Neither of these methods is suitable for making gaskets having desirable thick coatings of rubber on the upper and lower surfaces. In the dip-coating method, uniformity of coating thickness cannot be accurately controlled. Moreover when gaskets are dipped to obtain relatively thick coatings on the upper and lower surfaces, thick coatings are necessarily obtained on the edges of the gaskets as well. Such thick edge coatings render the gaskets unsuitable for certain applications.

In the die-cutting method, in which the gaskets are cut from rubber-coated fibrous sheet material, the edges of the fibrous insert are exposed, thus enabling oil to penetrate into the gasket and causing the rubber coatings to peel from the fibrous body member. This method of forming such gaskets is also uneconomical due to the high percentage of scrap formed in cutting gaskets from sheet material. The cost of forming heavy coatings on the upper and lower surfaces of a sheet material aggravates the uneconomic scrap problem.

Therefore, the optimum automotive valve cover gasket would be one comprising a fibrous insert provided with a relatively thin coating of rubber along its edges and a relatively thick coating on its upper and lower surfaces. With such a design, the surfaces for contacting the mating flanges to be sealed would be provided with a maximum amount of resilient material, while the rubber coatings on the gasket edges would be of a thickness just sufficient to prevent the oil from penetrating into the gasket and maintain the integrity of the assembly by obviating the tendency of the coating to peel off the fibrous body member. Since the fibrous insert would improve the creep resistance of the gasket, extremely low durometer rubber compounds could be incorporated into the gasket without fear of the gasket being extruded in use. While automotive valve cover gaskets, in particular, have been generally planar in form in the past, it would, of course, be desirable to develop other configurations providing improved sealing integrity.

SUMMARY OF THE INVENTION

It is, therefore, an object of the present invention to provide novel gaskets comprising an inner fibrous section and an outer soft rubber or rubber-like covering which is relatively thick on the sealing surfaces such as the upper and lower surfaces thereof, and any sealing edge or edges, and relatively thin on the remaining edges of the gasket. The preferred novel gaskets of the invention also have at least one concave surface to provide two lines of sealing contact with a surface to be sealed, such as the flange of an automotive valve cover. Such linear seal lines provide satisfactory sealing integrity at a lower compression than is possible with a sealing surface of greater width. The relatively thin edge coatings on those edges of the gasket not requiring a thick coating for sealing integrity are employed to complete the envelope of rubbery coating around the fibrous insert. In this way, the unity of the gasket is ensured while still permitting the fibrous insert to extend substantially to the edge of the gasket, thus providing increased resistance to cold flow or creeping of the gasket under compression.

The gaskets of the present invention may be produced by suspending an essentially imperforate fibrous insert structure smaller than, but configured in accordance with the ultimate gasket structure, in a mold such that the lower surface of the fibrous insert member is substantially the same distance from the bottom of the mold as the top surface thereof is from the top of the mold. An auto-setting compound, for example, of neoprene latex containing a coagulant such as sodium silico-fluoride, is then poured into the mold and allowed to set. Finally, the composite gasket is removed from the mold. Consequently by choosing an appropriately sized fibrous insert member and properly positioning it in the mold the latex surface of the gasket can be provided with any desired thickness at any point. For example, by choosing a fibrous insert almost as wide as the mold, only a very small area remains between the edge of the fibrous material and the side wall of the mold interior and a gasket is obtained having a thin edge coating of neoprene.

BRIEF DESCRIPTION OF THE DRAWINGS

FIG. 1 is a top plan view of the gasket.
FIGS. 2a–d are cross sections of the gasket.
FIGS. 3a–d are cross sections of the gasket with sealing surfaces.
FIGS. 4a–b are cross sections of the gasket.

DESCRIPTION OF THE PREFERRED EMBODIMENT

As a typical example of the gaskets of the invention, an automotive valve cover gasket 10 is illustrated in top plan view in FIG. 1. While the illustrated gasket 10 has a typical configuration, any other configuration either entirely closed, or having a cut-out portion 12 as shown, may be employed. As seen in FIG. 2a, for example, the gaskets include a fibrous or other flexible but relatively incompressible insert 14 covered with a rubbery coating 16, suitably of neoprene latex or other rubber-like material. One preferred embodiment of the invention shown in FIG. 2a has a concave upper surface 18 and a concave lower surface 20. It should be noticed, also that the rubbery coating 16 is relatively thick above and below the fibrous insert 14 in the area of the concave surfaces 18 and 20, but is relatively thin at the edges of the gasket 22 and 24.

Other embodiments of the invention are shown in cross section in FIGS. 2b, 2c and 2d. These embodiments differ from that of FIGS. 1 and 2a only in that one or more surfaces 26 of the gasket are planar rather than concave.

While gaskets of the invention having two planar sealing surfaces, as shown in FIG. 2d, represent a definite improvement over the prior art in that they have the relatively thick rubbery coatings on the sealing surfaces and relatively thin coatings on the edges characterizing such gaskets, they are less preferred than gaskets such as those shown in FIGS. 2b and 2c and particularly the gaskets of FIG. 2a, which have concave sealing surfaces.

As best seen in FIG. 3, a member to be sealed, such as a generally rectangular edge or flange of an automotive valve cover 28 is preferably introduced into a concave surface of a gasket of the invention and urged thereagainst so that the edges of the flange 28 contact the concave surface of the gasket in two or more linear seals. In this way excellent sealing contact is achieved along the linear contact areas with a minimum of compressive force. As seen in FIG. 3a the fibrous insert 14 may be co-extensive with or even in excess of the width of the flange 28 with the coated edges of the gasket protruding exteriorly of the flange. As shown in FIG. 3a, the two flanges 28 and gasket 10 are shown in their assembled relation but in an "exploded" or less than normally compressed condition for purposes of illustration. Under normal sealing conditions the flanges 28 would be pressed more tightly against the gasket 10 thus compressing the resilient concave surfaces 18 and 20 and broadening the areas of sealing contact along the original seal lines indicated at points 30 and 32. Compression of the outwardly flared portions of the concave surfaces 18 and 20 tends to force portions of the thus distorted or stressed rubbery coating inwardly thus thickening the coating in the central portion of the concave surfaces and causing it to bulge away but not separate from the central insert toward the adjacent flange 28.

As seen in FIG. 3b the gaskets of the invention may also have one planar sealing surface 26 in contact with a flange 28 and another concave surface in contact with another flange 28. Similarly, the gasket of FIG. 2d having two planar surfaces 26 would form a flat seal on each surface as shown with respect to the upper surface of the gasket in FIG. 3b.

The gaskets illustrated in FIGS. 2, 3 and 4 have relatively thick upper and lower rubbery coatings over the insert 14 on surfaces 18, 20 and 26, and relatively thin rubbery coatings on the edges 22 and 24 of the gaskets. The invention also includes gaskets having a relatively thick rubbery coating 36 on one or more edges of the gasket, as shown in FIGS. 4b and 5. While the thicker coating has been shown on the inner edge of the gasket in FIGS. 4b and 5 it could as well be on the outer edge of the gasket if necessary or desirable. Such relatively thick edge coatings are desirably employed adjacent fluid reservoirs to be sealed or other sources of liquid or gaseous pressure as, for example, on the inner edge of an automotive valve cover gasket in contact with hydrocarbon oil.

As seen in FIG. 5 of the drawings, the novel configuration of the preferred gaskets of the invention employing concave upper and lower surfaces, for example, presents a generally wedge-shaped gasket configuration to the source of fluid pressure to be sealed. Therefore, fluid pressure directed toward such a wedge-shaped gasket configuration, as seen in FIG. 5, tends to force the wedge into the space between the flanges 28 to be sealed. This forcing of the wedge into the aperture to be sealed, of course, increases the effectiveness and integrity of the seal. This is in contrast to the situation with a non-compressible planar gasket where such edgewise pressure would tend to force the planar gasket through and possibly out of the space to be sealed between the flanges.

Inasmuch as even the planar gaskets of the present invention have a compressible rubbery coating over the relatively stiff and relatively non-compressible fibrous insert, in all cases where the flanges 28 contact the surfaces of the gasket from either side under normal compression, the flanges indent the rubbery coatings thus causing a relatively elevated portion of the rubbery coating to form adjacent the sealed edges of the flanges. This relatively elevated portion acts similarly to the wedge shaped configuration of the concave-surfaced gaskets as described above, although to a lesser degree. It will be obvious that this is also the case with a gasket of the invention having one planar surface and one concave surface as shown in FIG. 3b.

It is especially preferred that the edge of the gasket adjacent any source of fluid pressure, as edge 36 in FIG. 5, have a relatively thick coating of rubbery material in order to increase the effectiveness of the wedge configuration and the integrity of the seal.

MANUFACTURE OF THE GASKETS

Although any suitable method may be employed to manufacture the gaskets of the invention, in the preferred procedure an essentially imperforate fibrous insert saturated with latex is cut or formed to the desired size and suspended in a gasket mold by means of pins depending from a frame which may take any suitable form, such as that of a strip of spring steel on edge having a contour similar to that of the gasket and mold. Next, a compound of neoprene latex is prepared with a coagulant additive such as sodium silicofluoride. Immediately after adding the coagulant, the autosetting compound of neoprene latex containiing the coagulant is poured into the mold to the desired height. The latex is then allowed to set up, which normally takes about three to 5 minutes. In practice, it has been found that the finished gasket can be removed from the mold after about ten minutes have elapsed from the time the latex compound was initially poured into the mold.

With respect to the first step, the material for the fibrous insert can be chosen from any group of materials that will exhibit inherently good load bearing and creep resistant characteristics. Such materials include composition cork, sheet metal, wood, plastics and the like, but more typical materials would be cotton linter board, mercerized wood pulp or dissolving wood pulp, saturated with neoprene, buna N, or acrylic rubber. The versatility of the present invention is seen in this first step wherein the fibrous insert can be cut to any desired size to thereby dictate the thickness of the coating which will ultimately form around each surface of the fibrous insert. This follows naturally since the structure of the mold and the insert cooperate to limit the usable area into which the latex compound can be poured. To produce a gasket of the present invention with relatively thick upper and lower surface coatings but relatively thin edge coatings, the fibrous insert should be cut or formed to a thickness which will allow a suitably thick upper and lower coating of latex. Conversely, the insert should be formed to a width which will afford only a very small area between the edges of the fibrous insert and the respective edge walls of the mold to limit the thickness of the coating which can be formed along the edges of the gasket. Of course, where a relatively thick edge is desired more space is left between the edge of the insert and the wall of the mold on the edge or edges where the greater thickness is desired.

The next step relates to suspending the fibrous insert from the pins fixed to and depending from the frame. The mold and the pins depending from the frame are arranged to provide an assembly which will cooperate to allow for the mounting of the fibrous insert at any desired elevation within the mold. Accordingly, it can be seen that the mounting of the fibrous insert on the pins determines the distance between the insert and the base or bottom of the mold. Consequently, an additional element of versatility which inheres in the present method for producing gaskets can be seen in the fact that the insert can be mounted at any elevation on the pins. However, practice has taught that locating the fibrous insert substantially centrally within the mold provides the optimum results since with this arrangement the upper and lower neoprene latex coatings will be formed with equal thicknesses.

The next step requires the preparation of the desired auto-setting neoprene latex compound for the gasket surface. A variety of neoprene or other rubber compounds can be used and accordingly the application for which the gasket is desired will normally dictate the compound to be used. However, neoprene latex compounds such as those set forth below have been found to be most suitable for use in making gaskets for automotive valve cover applications.

|  |  | Dry Parts | Percent |
|---|---|---|---|
| Example 1. | Single latex |  |  |
|  | Neoprene Latex 842A**** | 100 | 85.5 |
|  | Zinc Oxide Dispersion* | 15 | 12.8 |
|  | AgeRite White Dispersion** | 2 | 1.7 |
|  | Totals | 117 | 100.0 |
| Example 2. | Latex blend |  |  |
|  | Neoprene Latex 570**** | 100 | 78.7 |
|  | Hycar Latex 1551*** | 10 | 7.9 |
|  | Zinc Oxide Dispersion* | 15 | 11.8 |
|  | AgeRite White Dispersion** | 2 | 1.6 |
|  | Totals | 127 | 100.0 |

*Curing agent for neoprene latex
**An antioxidant for oxidation protection
***Butadiene/acrylonitrile type latex consisting of copolymers of butadiene and acrylonitrile, "OR" type for oil resistance, available from the B.F. Goodrich Co.
****Neoprene Latex 842 A and 571 are commercially available long chain synthetic rubbers made by polymerization of chloroprene (monochloro-butadiene $H_2C=CHCCl=CH_2$).

The preparation of the compound should include the addition of a coagulant such as a dispersion of sodium or potassium silicofluoride, mixtures of the two, or other equivalent coagulants, immediately before pouring the latex into the mold. The addition of coagulant, of course, provides the means by which the neoprene latex compound is coagulated into its final set form, since these materials cause a drop in pH in the latex system which accelerates setting of the rubber particles in the latex. It should be noted that some shrinkage occurs due to evaporation of the water in the latex as it sets up.

The next step required is pouring the compound of neoprene latex with additive into the mold to either a level indicated on the mold or to the top of the mold, if the mold is so sized. The auto-setting compound containing a coagulant formed as described above will set up in approximately 3 to 5 minutes, and the finished gasket can be removed from the mold about 10 minutes after the latex compound is first poured into it.

A gasket formed in this way in an open topped mold having a flat bottom, will have the cross section shown in FIG. 2a. The latex shrinks substantially on drying and due to this fact and the presence of the dimensionally stable insert suspended in the mold, the gasket will have concave upper and lower surfaces 18 and 20, respectively. The shrinkage of the latex also causes a slight beveling of the edges of the finished gasket as shown at points 38 in the cross-sectional view of FIG. 2a.

In order to achieve a gasket having a cross-section such as that shown in FIG. 2b, it is necessary to slightly overfill an open mold so that a convex meniscus of the latex compound is formed above the insert and upper edges of the mold. Shrinkage on drying causes the convex meniscus to recede to form a planar upper surface 26 on the finished gasket.

In order to obtain a gasket having a planar lower surface 26 as shown in FIG. 2c, a mold having a concave depression in its bottom may be used to accommodate excess latex compound, which on drying shrinks to provide the desired planar surface.

The gaskets of FIG. 2d may be obtained similarly by using an open mold having a concave bottom and overfilling it to provide a convex meniscus above the upper edge of the mold. On drying, shrinkage of the upper and lower convex latex surfaces around the fibrous insert, provides a gasket having planar upper and lower surfaces. These gaskets also have beveled edges due to the shrinkage of the latex cover.

The overall dimensions of the gaskets are, of course, determined by the existing specifications for the particular application or use. For example, 0.5-inch gasket may be designed to have an overall width of that dimension. The fibrous insert normally would then be selected to have a width slightly less than 0.5 inch in the range from about 0.312 to 0.468 inch; the thickness of the finished coating of latex on the gasket being from 0.016 to 0.094 inch. It will be seen that when such a gasket 0.5 inch wide, consisting of an insert 0.468 inch wide coated with latex and having latex edges 0.016 inch wide, is placed between a pair of flanges 0.5 inch wide, that the insert extends nearly the full width of the flanges, leaving on the 0.16 inch width of the latex edge on each side unsupported by the insert. It will be seen, therefore, that such a gasket provides assurance against cold flow or creeping due to the fact that the non-compressible fibrous insert extends nearly the full width of the flanges being sealed.

Preferably a somewhat oversize gasket is employed as shown in FIG. 3. In this case the width of the gasket insert is equal to or even in excess of the width of the flanges to be sealed and the latex edges, of course, protrude from either side of the flanges as shown. Here again, the gaskets prevent cold flow or creeping, since the entire width of the flanges is supported by the internal fibrous insert. Greater sealing integrity is provided by the gaskets of this embodiment due to the protruding wedge shaped latex edges of the gasket.

The thickness of the new gaskets and the thicknesses of the relatively thick and thin latex coatings is important to the proper functioning of the gaskets for use in sealing automotive valve covers, for example. These dimensions are set forth in Table I below.

TABLE I

GASKET DIMENSIONS

Thickness in Inches

|  | Approximate Range | | |
|---|---|---|---|
|  | Maximum | Minimum | Preferred |
| Finished Gasket | 0.250 | 0.063 | 0.156 |
| Insert | 0.094 | 0.031 | 0.062 |
| Rubber Coatings: | | | |
| Upper Surface | 0.094 | 0.016 | 0.047 |
| Lower Surface | 0.094 | 0.016 | 0.047 |
| Inner Edge | 0.094 | 0.016 | 0.031 |
| Outer Edge | 0.094 | 0.016 | 0.031 |

It will be seen from Table I above, that the finished, dry latex coatings on the new gaskets may vary from a minimum thickness of about 0.016 inch to a maximum thickness of about 0.094 inch. The preferred thickness of the latex coatings on the upper and lower surfaces of the gaskets is about 0.047 inch. The preferred thickness of the latex edges is about 0.031 inches. The dimensionally stable fibrous or other inserts may vary from about 0.031 to 0.094 inch in thickness and is preferably about 0.062 inch. Therefore, the finished gaskets have an overall thickness of about 0.062 to about 0.25 inch and are preferably about 0.156 inch in thickness.

In view of the above, the terms "relatively thick" and "relatively thin" used herein have the following meanings: As all dimensions herein are measured at the point of minimum thickness in the area referred to, i.e. in a concave surface the thickness is measured at the center of the surface rather than at the thicker edges thereof. As to the upper and lower latex surface coatings on either side of the fibrous insert, since the preferred thickness is 0.047 inch, any coating of that thickness or thicker up to the maximum of about 0.094 inch is a relatively thick coating, and any substantially thinner coating down to the minimum of about 0.016 inch is a relatively thin coating. Similarly, since the preferred thickness of the latex edge coatings is about 0.031 inch any coating of that thickness or thicker up to the maximum of about 0.094 inch is considered a relatively thick edge coating, and any substantially thinner coating down to the minimum of about 0.016 inch is considered a relatively thin edge coating.

It will be apparent from the above that the novel, internally reinforced rubber gaskets of the invention, whether of the double planar surface type of FIG. 2d or one of the preferred embodiments having at least one concave surface, provide creep resistant sealing integrity for automotive valve covers or use in a wide variety of other applications. It will also be apparent that the preferred gaskets with the concave surfaces provide for sealing at relatively low initial compression thus quickly and efficiently compensating for any imperfections of the surfaces of the flanges being sealed. Moreover, as shown in FIG. 3, when the flange to be sealed is inserted within the concave surface of a gasket of the invention two effective seal barriers are formed on initial compression thus providing double the sealing integrity of a conventional single line seal such as that obtainable with an 0-ring. The relatively enlarged edges of the new gaskets, as described above, also provide wedge-shaped sealing segments which prevent the gaskets from being extruded through the opening to be sealed between two flanges and in fact provide for an ever tighter seal as the pressure on the edge of the gasket is increased. This effect is clearly illustrated in FIG. 5 wherein the arrows indicate pressure forcing the enlarged left edge of the gasket into the space to be sealed. While FIG. 5 shows the initial relationship between the gasket and flanges for purposes of clarity, it will be appreciated that in the final sealed condition the flanges 28 would be drawn together so as to contact the gasket surfaces through most or all of the width of the flanges. It will also be appreciated that the thickness of the latex coating surrounding the dimensionally stable inserts in the new gaskets varies on the several surfaces and edges as necessary or desirable depending upon the use and in use environment of the gasket. More specifically, relatively thick coatings are normally desirable on the upper and lower surfaces and inner edge of the gaskets to provide the desired sealing integrity, but a relatively thin coating may be employed on the outer edge of the gasket, since there is no risk of fluid strike through at that edge.

While the present invention has been described in conjunction with certain preferred embodiments thereof and certain methods of making these embodiments, it is to be understood that this has been done by way of illustration only and is not to be construed as limiting the invention, the scope of which is delineated only by the prior art and the annexed claims.

What is claimed is:

1. an automotive valve cover gasket comprising a flexible substantially incompressible planar fibrous inner member enveloped in an external coating of a rubbery material, said coating completely enclosing and sealing all surfaces of said planar inner member and providing a compressible surface on each of the opposite faces thereof, at least one of said opposite faces being concave from edge to edge thereby providing a curved sealing surface into which the flange of an automotive valve cover can be inserted so as to meet the compressible rubbery coating in at least two seal lines thus providing a double seal at minimal compression.

2. An automotive valve cover gasket according to claim 1 having the following dimensions:

Thickness in Inches

|  | Approximate Range | |
|---|---|---|
|  | Maximum | Minimum |
| Finished Gasket | 0.250 | 0.063 |
| Inner Member 0.094 |  | 0.031 |
| Rubber Coatings: |  |  |
| Upper Surface | 0.094 | 0.016 |
| Lower Surface | 0.094 | 0.016 |
| Inner Edge 0.094 | 0.016 |  |
| Outer Edge | 0.094 | 0.016 |

3. An automotive valve cover gasket according to claim 2 wherein the finished gasket has a thickness of about 0.156 inch, an inner member about 0.062 inch in thickness, upper and lower surface coatings about 0.047 inch in thickness and edge coatings of about 0.016 to 0.094 inch in thickness.

* * * * *